United States Patent [19]
Jäckel

[11] Patent Number: 4,821,855
[45] Date of Patent: Apr. 18, 1989

[54] TORQUE TRANSMITTING ASSEMBLY

[75] Inventor: Johann Jäckel, Bühl, Fed. Rep. of Germany

[73] Assignee: Lu Lamellen und Kupplungsbau GmbH, Bühl, Fed. Rep. of Germany

[21] Appl. No.: 72,820

[22] Filed: Jul. 13, 1987

Related U.S. Application Data

[63] Continuation-in-part of Ser. No. 061,298, Jun. 10, 1987, Pat. No. 4,785,924.

[30] Foreign Application Priority Data

Jul. 11, 1986 [DE] Fed. Rep. of Germany ....... 3623433
Sep. 13, 1986 [DE] Fed. Rep. of Germany ....... 3631274

[51] Int. Cl.$^4$ .................. F16H 45/02; F16D 3/66; F16D 13/46
[52] U.S. Cl. .................. 192/3.29; 192/3.28; 192/70.2; 192/106.2; 464/68
[58] Field of Search .............. 192/3.28, 3.29, 3.3, 192/70.17, 70.2, 106.2; 464/68

[56] References Cited

U.S. PATENT DOCUMENTS

| 3,915,272 | 10/1975 | Maurice | 192/70.2 |
| 4,177,885 | 12/1979 | Ross | 192/3.3 |
| 4,580,668 | 4/1986 | Pickard et al. | 192/3.29 |

FOREIGN PATENT DOCUMENTS

3345980 5/1985 Fed. Rep. of Germany.

Primary Examiner—Allan D. Herrmann
Attorney, Agent, or Firm—Peter K. Kontler

[57] ABSTRACT

An assembly wherein a lock-up clutch is installed in the engine-driven housing of a hydrodynamic torque converter has a clutch apply member between two disc-shaped walls, and an input element which is riveted to the walls. A first friction disc of the clutch is non-rotatably but axially movably mounted on one of the walls and is located between the input element and a friction pad in the housing. A damper with resilient energy storing elements is installed between the walls on the one hand and the clutch apply member on the other hand. A second friction disc is non-rotatably but axially movably mounted in a cylindrical section of the housing and is disposed between the input element and the first friction disc.

12 Claims, 4 Drawing Sheets

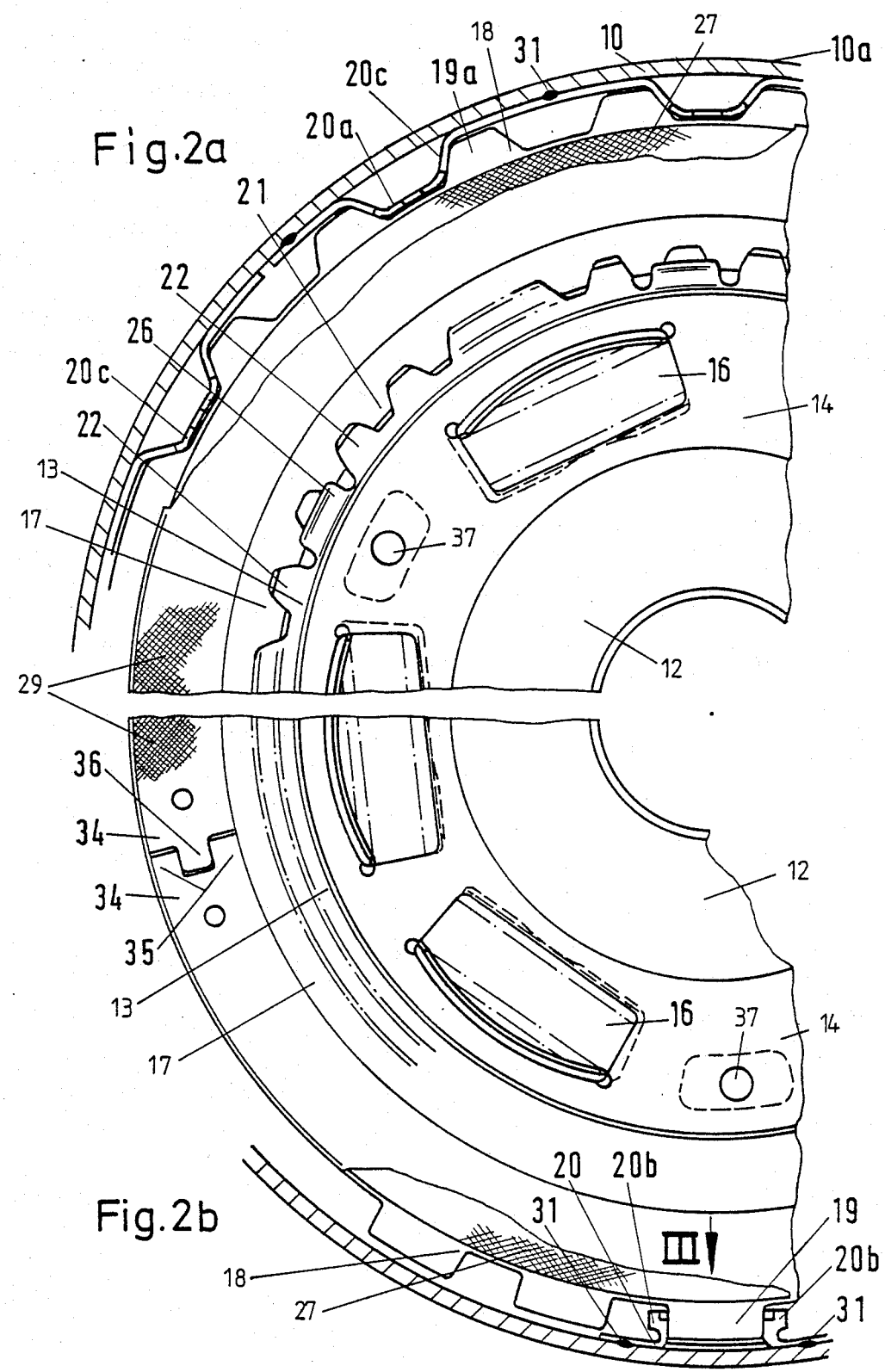

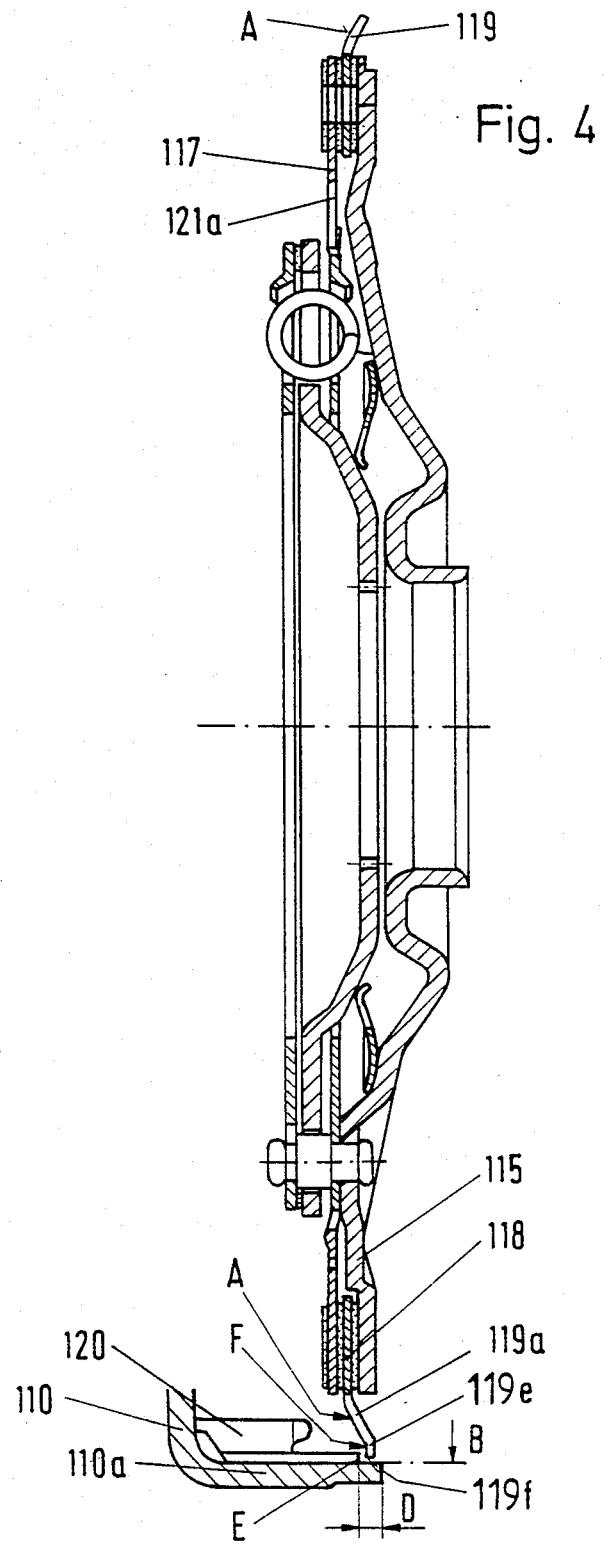

TORQUE TRANSMITTING ASSEMBLY

CROSS-REFERENCE TO RELATED CASE

This is a continuation-in-part of the copending patent application Ser. No. 061,298 filed June 10, 1987 for "Torque Transmitting Assembly".

BACKGROUND OF THE INVENTION

The present invention relates to torque transmitting apparatus in general, and more particularly to improvements in assemblies which are used to transmit torque between a prime mover and a hydrodynamic torque converter. Still more particularly, the invention relates to improvements in assemblies wherein a so-called lock-up clutch is installed in the usually bell-shaped housing of a hydrodynamic torque converter and the housing is connected or connectable to a prime mover, particularly to the internal combustion engine of a motor vehicle.

It is known to assemble the lock-up clutch of a combined hydrodynamic torque converter and lock-up clutch assembly from two disc-shaped walls which flank the clutch apply member of the assembly and wherein a damper with resilient energy storing elements is installed between such walls and the clutch apply member. The walls are further rigidly connected with a piston-like input element. Reference may be had to German Offenlegungsschrift No. 33 45 980 of Heinrich wherein an axially extending wall of the housing of the torque converter is provided with radially outwardly extending projections in mesh with the projections of a pressure applying disc. The latter is connected with a piston by a plug-in type coupling so that the pressure applying disc and the piston cannot rotate relative to each other. A friction generating lamination is riveted to a pair of disc-shaped walls which confine the energy storing elements, and such lamination extends between the piston and the pressure applying disc.

U.S. Pat. No. 4,177,885 to Ross discloses a modified assembly wherein an axially movable friction generating lamination (clutch disc) is non-rotatably secured to clutch apply piston. The latter is actuatable hydraulically and includes two parts with the energy storing springs of a damper between them. The two parts of the piston are rotatable relative to each other. This creates problems regarding the stability of the assembly, especially the stability of the two-part hydraulically operable piston, because the magnitude of axial forces acting upon the two parts of the piston is not the same. In addition, adequate sealing of the region where the two relatively rotatable parts of the piston are nearest to each other also presents many problems.

OBJECTS AND SUMMARY OF THE INVENTION

An object of the invention is to provide a torque transmitting assembly of the type wherein a hydrodynamic torque converter cooperates with a lock-up clutch which is simpler, more compact and less expensive than heretofore known assemblies.

Another object of the invention is to provide an assembly whose components can be rapidly assembled or taken apart and which can transmit pronounced torque even though its dimensions need not exceed those of heretofore known assemblies for transmission of smaller torques.

A further object of the invention is to provide a novel and improved lock-up clutch for use in the above outlined assembly.

An additional object of the invention is to provide the assembly with novel and improved means for transmitting torque between the housing of the hydrodynamic torque converter and a disc of the lock-up clutch.

Still another object of the invention is to provide an assembly wherein the remnants of blanks which are used to make a first set of component parts can be utilized to make a second set of component parts.

Another object of the invention is to provide novel and improved means for locating the discs of the lock-up clutch in optimum axial positions.

A further object of the invention is to provide a novel and improved torque converter housing or shell for use in the above outlined assembly.

An additional object of the invention is to provide a torque transmitting assembly wherein various parts can be assembled only in predetermined angular positions relative to each other to thus ensure proper engagement of torque transmitting portions.

Another object of the invention is to provide the assembly with a housing which prevents the insertion of certain torque receiving parts unless such parts are properly oriented in the radial and circumferential directions of the housing.

A further object of the invention is to provide novel and improved torque transmitting portions for use in the above outlined assembly.

The invention is embodied in a hydrodynamic torque converter and lock-up clutch assembly which can be used with advantage in motor vehicles and comprises a housing forming part of the torque converter and connectable to the engine of a motor vehicle, a clutch apply member in the housing, two preferably disc-shaped walls which flank the clutch apply member and are rotatable relative thereto, an input element (e.g., a piston of the torque converter) which is affixed to and is rotatable with the walls, a damper having energy storing means interposed between the walls on the one hand and the clutch apply member on the other hand to yieldably oppose rotation of the walls and clutch apply member relative to each other, and a first friction disc which is non-rotatably and axially movably mounted on one of the walls. The disc and the one wall have limited freedom of axial movability relative to each other. The disc and the one wall respectively have cooperating first and second torque transmitting portions in the form of teeth, splines or the like, and the torque transmitting portions of the disc surround the one wall and its torque transmitting portions. A second friction disc can be provided between the first disc and the input element. The housing and the second disc respectively have cooperating first and second torque transmitting portions which enable the second disc to move axially with reference to the housing.

First friction generating means can be interposed between the first and second discs, and second friction generating means can be interposed between the second disc and the input element. The latter can be provided with means for centering the second disc, and such centering means can comprise at least one axially extending protuberance on the input element (preferably an annulus of protuberances which constitute axially shifted integral portions of the input element).

The assembly can further comprise means for locating the first disc in the axial direction of the clutch; the locating means can comprise projections which are provided on the one wall and are adjacent that side of the first disc which faces away from the second disc and from the input element. Such projections can include radially outwardly extending prongs, and these prongs preferably alternate with the torque transmitting portions of the one wall (as seen in the circumferential direction of the discs). Moreover, the locating projections are preferably axially offset with reference to the torque transmitting portions of the one wall. The torque transmitting portions of the one wall can extend substantially axially of the clutch with reference to the centrally located main portion of the one wall. Such torque transmitting portions and a plane which is normal to the axis of the clutch can make an angle of 10–45 degrees.

The locating projections on the one wall can be used in addition or in lieu of locating means which is provided on the first disc and can include a set of radially inwardly extending projections overlying that side of the main portion of the one wall which faces toward the input element. The locating projections of the first disc are axially offset with reference to the torque transmitting portions of the first disc and are preferably adjacent a central opening of the first disc. Such projections alternate with the torque transmitting portions of the first disc in the circumferential direction of the discs.

The one wall is preferably that wall which is located between the input element and the clutch apply member.

The inner diameter of at least one of the discs preferably exceeds the outer diameter of at least one of the walls.

The friction generating means at one side of the second disc is adjacent a friction generating means on the first disc, and the latter is adjacent a friction generating means in the housing.

The housing can include a substantially cylindrical section which surrounds the discs and the input element. The torque transmitting means of the housing (for the second disc) can be provided on the internal surface of the cylindrical section and is designed in such a way that the second disc cannot rotate in the housing but is movable axially of the cylindrical section. The torque transmitting portions of the housing can be bonded (e.g., spot welded) to the internal surface of the cylindrical section and are located radially outwardly of the input element. Each torque transmitting portion of the housing can comprise at least two radially inwardly extending prongs, and each torque transmitting portion of the second disc is received between two prongs of a different torque transmitting portion on the housing. Each torque transmitting portion of the housing can further include a support or web which is integral with the respective prongs, and such prongs can constitute inwardly bent lugs of the support. The latter is welded to the internal surface of the cylindrical section of the housing. The prongs of each torque transmitting portion of the housing can be parallel to each other, and each torque transmitting portion of the second disc can have two parallel surfaces which are flanked by the respective pair of prongs so that the second disc is automatically centered when its torque transmitting portions are in proper engagement with the torque transmitting portions of the housing. The prongs of torque transmitting portions on the housing can be provided with divergent ramps or cams to facilitate introduction of the torque transmitting portions of the second disc in the axial direction of the discs.

The assembly is preferably constructed in such a way that the (second) torque transmitting portions of the second disc can be moved axially of the housing and into engagement with the (first) torque transmitting portions of the housing only in predetermined angular positions of the housing and the second disc relative to each other. The second disc can be moved to one or more predetermined angular positions in which it is free to move axially of the housing in a predetermined direction so as to move its torque transmitting portions into engagement with the torque transmitting portions of the housing. When the second torque transmitting portions properly engage the first torque transmitting portions, the aforementioned cylindrical section at least partially surrounds the second disc. The second disc can be provided with projections which serve to interfere with a movement of the housing and/or the second disc in the axial direction of the housing (particularly with a movement of the second disc in the axial direction of the housing) except in the predetermined angular positions of the housing and the second disc relative to each other. When the second disc is moved axially of the housing in the predetermined direction, the projections of the second disc engage and are arrested by suitable stops which are provided on or in the housing in the path of movement of the projections when the actual angular position of the second disc with reference to the housing deviates from a single predetermined angular position or from one of several predetermined angular positions; the stops then prevent further movement of the second disc in the predetermined direction and toward the axial position in which its torque transmitting portions engage the torque transmitting portions of the housing.

The second torque transmitting portions and the projections preferably extend radially outwardly of the second disc, and the projections are preferably longer than the second motion transmitting portions. The radially outermost portions of the projections are preferably positioned and arranged to engage the stops when the second disc is moved axially but its angular position does not coincide with the single predetermined angular position or with one of several predetermined angular positions. The stops can be provided on the first torque transmitting portions and can constitute front end faces of the first torque transmitting portions; such end faces face counter to the predetermined direction.

The housing can be provided with ramps in the form of cam faces which are adjacent the stops and serve to change the angular position of the second disc with reference to the housing when the second disc and the housing are relatively close to their predetermined angular positions so that the cam faces can compel the second disc and/or the housing to assume the single predetermined angular position or one of several predetermined angular positions and the second disc is free to move its torque transmitting portions into engagement with the first torque transmitting portions. The cam faces can be provided on the first torque transmitting portions.

The projections and/or the second torque transmitting portions can slope in the axial direction of the housing toward the input element.

The novel features which are considered as characteristic of the invention are set forth in particular in the appended claims. The improved assembly itself, however, both as to its construction and its mode of operation as well as the mode of assembling its parts, together with additional features and advantages thereof, will be best understood upon perusal of the following detailed description of certain specific embodiments with reference to the accompanying drawing. BRIEF DESCRIPTION OF THE DRAWING FIG. 1a is a fragmentary axial sectional view of a torque transmitting assembly which embodies one form of the invention;

FIG. 2a is an end elevational view as seen in the direction of arrow IIa in FIG. 1a;

FIG. 2b is an end elevational view as seen in the direction of arrow IIb in FIG. 1b;

FIG. 4 is an axial sectional view of a third torque transmitting assembly;

Figure 5:
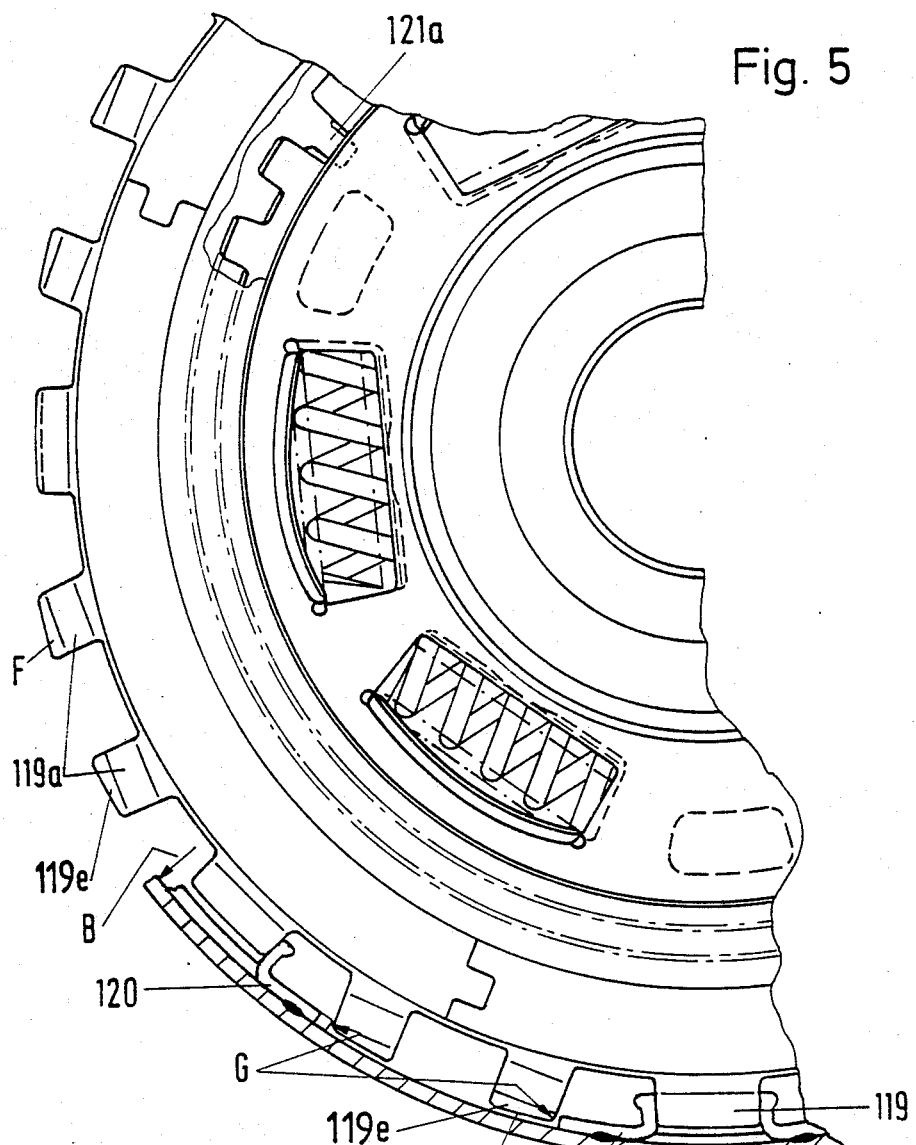
Figure 6:
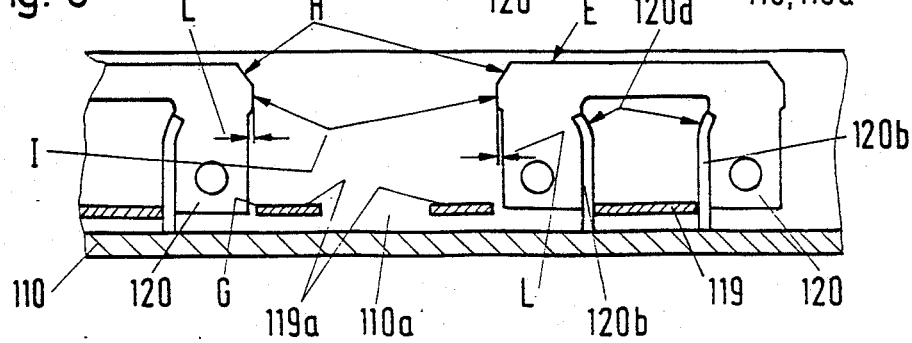

FIG. 5 fragmentary end elevational view as seen from the right-hand side of FIG. 4; and FIG. 6 is an enlarged view of a detail in the structure of FIG. 5.

DESCRIPTION OF PREFERRED EMBODIMENTS

Figure 1A:
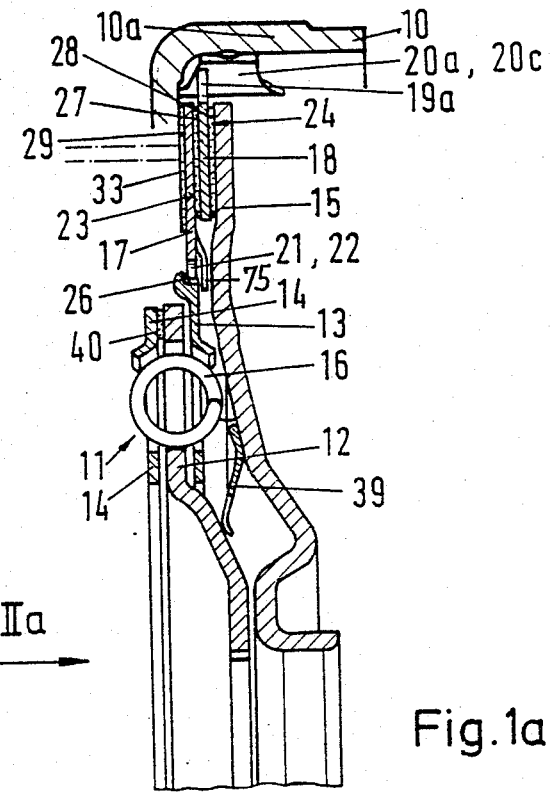
FIG. 1b is a similar fragmentary axial sectional view of a modified assembly.

Referring first to FIGS. 1a and 2a, there is shown an assembly wherein a lock-up clutch cooperates with the hollow shell or housing 10 of a hydrodynamic torque converter. The housing 10 can be coupled to the engine of a motor vehicle, and the clutch comprises a piston-like input element 15, a first clutch disc 17 which has a centrally located opening and radially inwardly extending torque transmitting portions 21, and a second disc 18 which is installed axially between the input element 15 and disc 17 and has an annulus of radially outwardly extending torque transmitting portions 19a. The sides of the second disc 18 are provided with friction generating linings or pads 27, 28 which respectively face toward the disc 17 and input element 15, and the friction disc 17 has a first friction generating lining or pad 29 at that side which faces away from the input element 15 and a second friction generating lining or pad 23 adjacent the pad 27 of the disc 18. The input element 15 has a friction generating lining or pad 24 which is adjacent the friction generating pad 28 of the disc 18, and the housing 10 has a friction generating lining or pad 33 which is adjacent the friction generating pad 29 of the disc 17.

The housing 10 includes a substantially cylindrical section 10a which surrounds the discs 17, 18 and the input element 15 and whose internal surface is provided with torque transmitting portions 20a. Each torque transmitting portion 20a includes a radially inwardly extending prong 20c, and the prongs 20c alternate with the torque transmitting portions 19a of the disc 18 in such a way that the disc 18 has freedom of axial movement relative to the cylindrical section 10a. The torque transmitting portions 20a can jointly form a one-piece circular band at the inner side of the cylindrical section 10a. The prongs 20c of the torque transmitting portions 20a extend radially inwardly from the outermost portions or supports of the respective portions 20a and such outermost portions or supports are bonded (preferably welded) to the internal surface of the cylindrical section 10a. The welded spots are shown at 31.

The components 10, 15, 17, 18 are made of metallic sheet material. The torque transmitting portions 19a resemble teeth which are coplanar with the main portion of the disc 18 and are received with freedom of axial movement between the respective prongs 20c. Each of the portions 19a resembles a wedge, the same as each prong 20c. The supports of the portions 20a are disposed radially outwardly of the respective prongs 20c and are spot welded at 31 to the internal surface of the cylindrical section 10a. The curvature of the outer sides of the supports preferably matches or closely approximates the curvature of the internal surface of the cylindrical section 10a. It is possible to replace the illustrated torque transmitting portions 20a with portions each of which has two or more prongs. The torque transmitting portions 20a can be equidistant from each other, as considered in the circumferential direction of the cylindrical section 10a, or they may be welded to the cylindrical section in a different distribution. The material, the dimensions and the number of torque transmitting portions 20a will be selected with a view to ensure that they can transmit the anticipated torque without becoming detached from the section 10a.

FIG. 2a shows that the prongs 20c taper radially inwardly and that the torque transmitting portions 19a of the disc 18 taper radially outwardly. FIG. 2a also shows that the prongs 20c alternate with pairs of torque transmitting portions 19a, as seen in the circumferential direction of the cylindrical section 10a.

Figure 1B:
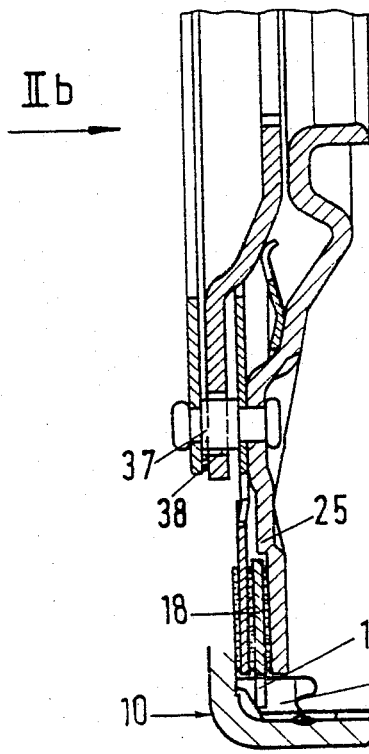
Figure 3:
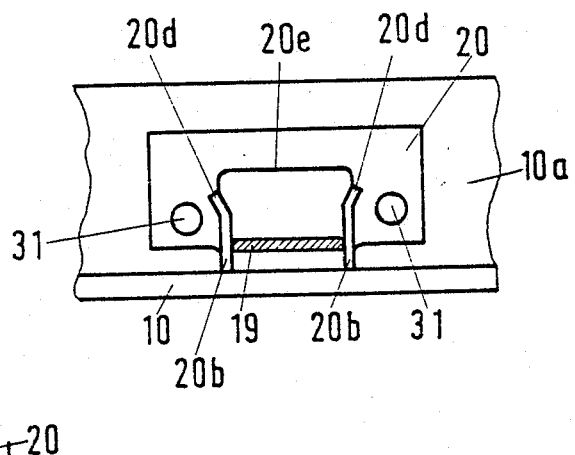
FIG. 3 is a fragmentary part elevational and part sectional view as seen in the direction of arrow III in FIG. 2b.

The embodiment which is shown in FIGS. 1b, 2b and 3 has a housing 10 wherein the internal surface of the cylindrical section 10a carries different torque transmitting portions 20 which cooperate with the radially outwardly extending torque transmitting portions 19 of the disc 18. The mutual spacing of neighboring portions 20 can be identical or different, and the number of such portions will depend on the magnitude of torque which is to be transmitted between the engine (housing 10) and the disc 18. The centrally located supports 20e of the torque transmitting portions 20 are spot welded to the cylindrical section 10a at 31. Each portion 20 further comprises two radially inwardly extending prongs 20b each of which is a lug bent inwardly from the respective support 20e, preferably in such a way that each pair of prongs 20b flanks the respective torque transmitting portion 19 of the disc 18 with no circumferential play or with a minimum of such play. The pairs of prongs 20b are provided with divergent cam portions or ramps 20d which facilitate introduction of the respective torque transmitting portions 19 in the axial direction of the cylindrical section 10a, i.e., downwardly as seen in FIG. 3. The ramps 20d can constitute slightly bent lugs of the respective prongs 20b.

The pairs of prongs 20b are preferably parallel to each other, and the same applies for the adjoining surfaces of the torque transmitting portions 19 between such pairs of prongs 20b. This simplifies the making of the disc 18 and allows for accurate centering of the disc 18 with reference to the housing 10 and other parts of the improved assembly.

Each of the friction pads 23, 24, 27, 28, 29 can constitute a single one-piece washer or each of these pads can be assembled of several portions 34 (see FIG. 2b) which have interdigitated projections in the form of teeth 35, 36. For example, and as shown in FIG. 2b, the tooth 36 at one end of an arcuate pad portion 34 can be disposed between two teeth 36 of the neighboring pad portion 34.

The disc 17 of each of the two illustrated assemblies has radially inwardly extending torque transmitting portions 21 which alternate and are coplanar with radially outwardly extending torque transmitting portions 22 of a disc-shaped wall 13. The wall 13 is fixedly secured to a similar disc-shaped wall 14 by distancing elements in the form of rivets 37 which are anchored in the input element 15 so that the parts 13, 14 and 15 rotate as a unit. The walls 13, 14 flank a flange-like clutch apply member 12. The member 12 has circumferentially spaced apart windows which register with windows in the walls 13, 14 and receive energy storing elements in the form of coil springs 16 forming part of a damper 11 of engine torsional vibrations. The damper 11 yieldably opposes rotation of the clutch apply member 12 relative to the walls 13, 14 and input element 15 and/or vice versa. The torque transmitting portions 22 at the periphery of the disc-shaped wall 13 are bent with reference to the substantially flat central or main portion of the wall 13 in the axial direction of the clutch and preferably at angles of 10–45 degrees. The plane of the main or central portion of the wall 13 is preferably normal to the axis of the disc 18.

The means for locating the disc 17 in the axial direction, i.e., for preventing this disc from moving axially and away from the wall 13 so that the torque transmitting portions 21 would become disengaged from the torque transmitting portions 22 of the wall 13, comprises projections 26 which are integral portions of the wall 13 and overlie that side of the disc 17 which faces away from the disc 18 and input element 15. Alternatively, or in addition to the locating means including the projections 26, the disc 17 can be held against axial movement away from the disc 18 and input element 15 by integral projections 75 which are provided on its radially innermost portion (the disc 17 has a central opening) and overlie the right-hand side of the wall 13 as seen in FIG. 1a or 1b. The arrangement is preferably such that the projections 26 and/or the projections 75 of the disc 17 alternate with the torque transmitting portions 21 in the circumferential direction of the disc-shaped wall 13. It will be noted that the projections 26 are axially offset with reference to the torque transmitting portions 21, and the same applies for the projections 75 (which overlie the right-hand side of the wall 13 in FIG. 1a or 1b) and the torque transmitting portions 21. The projections 26 further alternate with the torque transmitting portions 22 of the wall 13.

The input element 15 resembles a piston and is formed with means for centering the wall 13 thereon. Such centering means comprises an annulus of protuberances 25 which can constitute axially displaced or shifted portions of the input element 15 and form a ring of shoulders around the periphery of the wall 13. The wall 13 preferably fits into the annulus of protuberances 25 with a minimum of play. These protuberances ensure that the wall 13 is properly centered when the improved assembly is in use as well as during storage and transport of the assembly.

In order to reduce waste during making of the improved assembly, the dimensions of the discs 17, 18 and of the disc-shaped walls 13, 14 can be selected in such a way that the inner diameter of the disc 17 slightly exceeds the outer diameter of the wall 14 and the inner diameter of the disc 18 slightly exceeds the outer diameter of the wall 13 which carries the disc 17. Thus, the material which is removed from the center of a blank that is to form the disc 17 can be used to make the wall 14, and the material which is removed from the center of the blank that is to form the disc 18 and its radially outwardly extending torque transmitting portions 19 or 19a can be used to form the wall 13 and its radially outwardly extending torque transmitting portions 21.

The distancing elements 37 extend through cutouts or slots 38 which are provided in the clutch apply member 12. Since the distancing elements 37 are rigid with the input element 15, they cooperate with the surfaces bounding the ends of the slots 38 to determine the extent of angular movability of the parts 12 and 15 relative to each other.

A diaphragm spring 39 is installed between the member 12 and input element 15 in axially stressed condition to generate frictional damping action in response to angular displacement of the member 12 relative to the input element 15 and/or vice versa. A friction pad 40 is interposed between the member 12 and the wall 14; this pad is held in compressed condition by the diaphragm spring 39.

The mode of operation of the improved assembly is the same or analogous to that of the assembly which is disclosed in the patent to Ross. The disclosure of Ross is incorporated herein by reference.

An important advantage of the improved assembly, wherein at least one of the disc-shaped walls 13, 14 carries an axially movable disc (17) which is non-rotatably coupled to the one wall, is that a second or additional disc (18) can be installed between the disc 17 and the input element 15 in such a way that the disc 18 receives torque from the housing 10 and can transmit torque to the disc 17 when the input element 15 is biased to the left, as seen in FIG. 1a or 1b, whereby the disc 17 cooperates with the walls 13, 14 and clutch apply member 12 to rotate an output element of the torque converter.

Another advantage of the improved assembly is its simplicity. The torque transmitting connection between the disc 17 and the respective wall 13 is very simple and inexpensive and the friction generating pads 23, 24, 27, 28, 29 and 33 add very little to the cost of the clutch.

The provision of centering protuberances 25 on the input element 15 is optional but desirable and advantageous because this ensures that the intermediate disc 18 is adequately centered on the input element 15 in actual use of the assembly as well as during storage and shipment. Moreover, the protuberances 25 facilitate insertion of the clutch into the housing 10 because the position of the disc 18 with reference to the cylindrical section 10a is proper as long as the position of the input element 15 with reference to the housing 10 is correct. Therefore, the combination including the input element 15 and the disc 18 can be installed in the housing 10 without any special equipment.

The locating projections 26 and/or any equivalents thereof contribute to simplicity of the clutch and facilitate the installation of such clutch in the housing 10. Moreover, these locating projections render it possible to install the clutch in the housing 10 with little loss in time and without any specially designed equipment because the axial position of the disc 17 with reference to the respective wall 13 is fixed in the manufacturing plant. The assembly of Ross does not employ such locating means.

While it is also possible to mount the disc 17 on the wall 14, the construction which is actually shown in the drawing is preferred at this time because it contributes to compactness of the assembly, especially in the axial direction of the clutch.

As mentioned above, the outer diameter of the wall 14 is less than the inner diameter of the disc 17, and the outer diameter of the wall 13 is less than the inner diameter of the disc 18. This renders it possible to convert a first blank into the wall 13 and disc 17, and to convert a second blank into the wall 13 and disc 18 with attendant savings in material.

Compactness of the improved assembly is further attributable to the fact that, with the exception of torque transmitting portions 19 or 19a on the intermediate disc 18, the components of the clutch need not extend radially beyond the input element 15.

It is possible to provide the housing 10 with integral torque transmitting portions 20 or 20a. The provision of separately produced torque transmitting portions 20 or 20a which are welded to the cylindrical section 10a is preferred at this time because this contributes to simplicity and lower cost of the housing 10. The torque transmitting portions 20 are preferred at this time because they can be shaped and applied by using relatively simple tools. Moreover, the prongs 20b can accurately center the disc 18.

FIGS. 4 to 6 show a portion of a third assembly wherein all such parts which are identical with or clearly analogous to the corresponding parts of the assembly of FIG. 1a or 1b are denoted by similar reference characters plus 100. The disc 118 of the lock-up clutch has substantially radially outwardly extending relatively short torque transmitting portions 119 and substantially radially outwardly extending relatively long projections 119a. The projections 119a and the portions 119 slope in the axial direction toward the piston-like input element 115 of the lock-up clutch so that their left-hand sides or surfaces (as seen in FIG. 4) together define a composite conical surface A which tapers toward the axis of the lock-up clutch in a direction to the right, as seen in FIG. 4. The slope of the conical surface A with reference to a plane which is normal to the axis of the lock-up clutch is or can be in the range of approximately 30 degrees. The purpose of the composite conical surface A is to facilitate assembly of the lock-up clutch including the input element 115 and the discs 117, 118 with the hydrodynamic torque converter which includes the housing 110. The purpose of the portions 119 is to transmit torque from the housing 110 of the torque converter to the disc 118 of the lock-up clutch, i.e., the function of portions 119 is analogous to that of the portions 19 in the assembly of FIG. 1b. To this end, the portions 119 cooperate with torque transmitting portions 120 provided at the inner side of the cylindrical section 110a of the housing 110 and constituting functional-equivalents of the torque transmitting portions 20 at the inner side of the cylindrical section 10a of the housing 10 shown in FIGS. 1a and 1b.

The purpose of the relatively long projections 119a on the disc 118 is to facilitate proper assembly of the housing 110 with the lock-up clutch in that they allow for such assembly (in the axial direction) only in predetermined angular positions of the housing 110 and the clutch with reference to each other. The arrangement is such that the relatively short portions 119 enter between the pairs of prongs or lugs 120b on the corresponding torque transmitting portions 120, without any assistance from optical means, and can be pushed to their required positions in the axial direction of the housing 110 when the projections 119a assume predetermined positions with reference to the portions 120. Proper positioning of projections 119a with reference to the portions 120 is a prerequisite for the ability of portions 119 to penetrate into the spaces between the respective pairs of prongs or lugs 120b.

FIGS. 4 and 5 show that the projections 119a of the disc 118 overlie the portions 120 in the radial direction of the clutch so that, when the selected angular position of the disc 118 with reference to the housing 110 does not match a single predetermined angular position or one of several predetermined angular positions, the radially outermost portions 119e of the projections 119a abut the front end faces (stops) E of the adjacent portions 120. In other words, and referring to FIG. 6, if the disc 118 is moved downwardly while its angular position with reference to the housing 110 does not coincide with a predetermined or required angular position for assembly of the torque converter with the lock-up clutch, the radially outermost portions 120e of the tooth-like projections 119a strike the front end faces or stops E of the nearest portions 120 and thus prevent any further axial movement of the disc 118 along the internal surface of the cylindrical section 110a of the housing 110 (i.e., any further downward movement, as seen in FIG. 6).

The portions 119 are sufficiently shorter than the projections 119a so that they could bypass the front end faces E of the portions 120 even when such front end faces E are about to be engaged by the oncoming projections 119a. The ramps 120d on the prongs or lugs 120b of the portions 120 for the portions 119 are located behind the front end faces E of the respective portions 120 (see FIG. 6), i.e., the projections 119a of the improperly oriented disc 118 will strike against the respective front end faces E before the portions 119 can reach the respective pairs of ramps 120d. The longitudinal ends of the front end faces E are flanked by pairs of ramps or cam faces H whose purpose is to guide the adjacent projections 119a toward their optimum positions for penetration into the spaces between neighboring portions 120 at the inner side of the cylindrical section 110a of the housing 10. The lateral edge faces I of the portions 120 are recessed at L so that each such lateral edge face I exhibits a protuberance adjacent the respective cam face or ramp H and is then recessed at L to provide (if necessary) some room for angular movements of the disc 118 and housing 110 relative to each other during introduction of portions 119 into the spaces between the respective prongs or lugs 120b. In other words, the recesses L ensure that the ramps 120d can indeed steer the respective portions 119 to optimum positions during axial movement of the disc 118 in a downward direction, as seen in FIG. 6, so that the portions 119 can move axially of the clutch well beyond the front end faces or stops E on to the final positions shown (for one of the portions 119) in FIG. 6. The recesses L can be shortened or lengthened without departing from the spirit of the invention.

While one of two neighboring projections 119a slides along the adjacent cam face or ramp H on its way toward contact with the respective lateral edge face I, it automatically steers the other projection 119a of such pair toward engagement with the corresponding edge face I so that the two projections 119a automatically move the disc 118 to the single predetermined angular position or to one of several predetermined angular positions in which the projections 119a can continue to penetrate into the space between the respective edge faces I and toward the respective recesses L and enable the adjacent portions 119 to find their way into the spaces between the respective prongs or lugs 120b after having advanced between the ramps 120b of such prongs. The pairs of neighboring edge faces I are preferably parallel or substantially parallel to each other, and the length of their non-recessed portions (immediately adjacent the respective cam faces or ramps H) is preferably selected in such a way that they ensure entry of neighboring portions 119 not only into the spaces between the respective ramps 120d but actually beyond such ramps and between the substantially parallel portions of the respective prongs or lugs 120b.

An advantage of the assembly which is shown in FIGS. 4 to 6 is that the torque transmitting unit can be mounted on the toothed input shaft of the transmission or turbine wheel during assembly of the hydrodynamic torque converter and can be assembled, in a following step, with the housing 110 without employing any optical means such as would serve to facilitate accurate angular positioning of the parts 110 and 118 relative to each other. The aforediscussed inclination of the portions 119 and projections 119a (whose surfaces together form the conical surface A) ensures that the disc 118 is properly centered with reference to the housing 110 (whose inner diameter is shown at B) in the radial direction of the housing. Once such initial radial centering step is completed, the radially outermost edge faces 119e of the radially outermost portions 119e of the projections 119a are free to slide along the internal surface of the cylindrical section 110a of the housing 110 (the diameter of the interrupted cylindrical surface which is formed jointly by the outermost edge faces of all projections 119a can closely approximate the inner diameter B of the section 110a) so that the projections 119a are free to move axially of the housing 110 and their surface portions F strike the front end faces or stops E of the adjacent portions 120 if their angular positions do not match the prescribed or predetermined angular positions. The distance D between the open end of the cylindrical section 110a and the front end faces E of the portions 120 at the inner side of such section is shown in the lower portion of FIG. 4. If the initial angular position of the disc 118 with reference to the housing 110 is unsatisfactory, i.e., if the left-hand surfaces F of the projections 119a e against the front end faces E of the adjacent portions 120, axial movement of the disc 118 deeper into the interior of the housing 110 comes to a halt and it is necessary to change the angular position of the disc 118 relative to the housing 110 and/or vice versa in order to ensure that one flank G (FIG. 5) of one of each pair of neighboring projections 119a will be free to slide along the adjacent cam face H toward engagement with the respective lateral edge face I.

The depth of the recesses L in the lateral edge faces I of the portions 120 can be selected in such a way that the flanks G of projections 119a of the disc 118 are out of contact with the adjacent portions 120 when the portions 119 are properly received between the respective pairs of prongs or lugs 120b. This means that the last stage of angular orientation of the disc 118 with reference to the housing 110 is effected by the portions 119 in cooperation with the respective pairs of prongs 120b.

The embodiment of FIGS. 4 to 6 further distinguishes over the embodiments of FIGS. 1a and 1b in that axial movements of the clutch disc 117 of the lock-up clutch including the disc 118 relative to the flange-like clutch apply member 112 and disc 118 can be limited by three relatively long radially inwardly extending tongues or prongs 121a which overlie the radially outermost portion of the member 112. The tongues or prongs 121a abut or can abut the wall 113 in the same way as described in connection with FIG. 1a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hydrodynamic torque converter and lock-up clutch assembly, particularly for motor vehicles, comprising a rotary housing; a clutch apply member in said housing; two walls flanking and being rotatable relative to said clutch apply member; an input element affixed to and rotatable with said walls; energy storing means interposed between said walls on the one hand and said clutch apply member on the other hand and arranged to yieldably oppose rotation of said walls and said clutch apply member relative to each other; a first friction disc non-rotatably and axially movably on one of said walls; a second friction disc between said first friction disc and said input element, said housing and said second disc respectively having cooperating first and second torque transmitting portions and said torque transmitting portions being movable into engagement with each other axially of said rotary housing in predetermined angular positions relative to each other.

2. The assembly of claim 1, wherein said housing includes a section which at least partially surrounds said second disc when said second torque transmitting portions engage said first torque transmitting portions.

3. The assembly of claim 2, wherein said second disc includes projections which are arranged to interfere with movement of said housing and said second disc in the axial direction of the housing except in said predetermined angular positions of said housing and said second disc relative to each other.

4. The assembly of claim 3, wherein said second disc is movable axially of said housing in a predetermined direction to engage said second torque transmitting portions with said first torque transmitting portions in said predetermined angular positions of said housing and said second disc relative to each other, said housing having stop means located in the path of movement of said projections during movement of said second disc in said predetermined direction so as to prevent said second torque transmitting portions from reaching and engaging said first torque transmitting portions except when said housing and said second disc assume said predetermined angular positions with reference to each other.

5. The assembly of claim 4, wherein said second torque transmitting portions and said projections extend radially outwardly of said second disc and said projections are longer than said second torque transmitting portions.

6. The assembly of claim 5, wherein said stop means is provided on said first torque transmitting portions.

7. The assembly of claim 6, wherein said first torque transmitting portions have end faces facing counter to said direction and including or constituting said stop means.

8. The assembly of claim 5, wherein said projections include radially outermost portions and said stops are located in the path of movement of said radially outermost portions when said housing and said second disc are out of said predetermined angular positions relative to each other while said second disc is moved in said predetermined direction.

9. The assembly of claim 4, wherein said housing has cam faces adjacent said stops and arranged to change the angular position of said second disc with reference to said housing and/or vice versa when said second disc and said housing are relatively close to said predetermined angular positions with reference to each other so that the cam faces compel the second disc and/or the housing to assume the predetermined angular position and to be free to move the second torque transmitting portions into engagement with said first torque transmitting portions.

10. The assembly of claim 9, wherein said cam faces are provided on said first torque transmitting portions.

11. The assembly of claim 3, wherein said projections slope in the axial direction of said housing toward said input element.

12. The assembly of claim 1, wherein said second torque transmitting portions slope axially of said housing toward said input element.

* * * * *